United States Patent [19]

Gore

[11] Patent Number: 4,869,304

[45] Date of Patent: Sep. 26, 1989

[54] APPARATUS AND METHOD FOR MANUFACTURING CUSTOM GOLF CLUB SETS

[76] Inventor: Bruce A. Gore, P.O. Box 18227, San Antonio, Tex. 78218

[21] Appl. No.: 178,249

[22] Filed: Apr. 6, 1988

[51] Int. Cl.⁴ .......................... B27F 9/00; B27C 1/00
[52] U.S. Cl. ...................................... 144/354; 29/711; 29/720; 29/783; 83/465; 144/1 R; 144/2 R; 144/359; 269/40; 269/296
[58] Field of Search ................. 273/169, 171; 269/40, 269/228, 296, 303, 307, 315; 144/1 R, 2 R, 354, 359; 29/711, 720, 783; 83/462 R, 465, 468, 485, 487, 488

[56] References Cited

U.S. PATENT DOCUMENTS 1,295,587 2/1919 Peter ..................................... 83/468

Primary Examiner—W. Donald Bray
Attorney, Agent, or Firm—David G. Henry

[57] ABSTRACT

A system and method for using an individual's unique golf club parameters in the design and manufacture of custom golf club sets at a single work station. The invention accurately measures and cuts the head and butt ends of a complete set of golf club shafts in a single step, permits uniform installation of grips, and precise adjustment of loft and lie and of swing weight distribution.

14 Claims, 4 Drawing Sheets

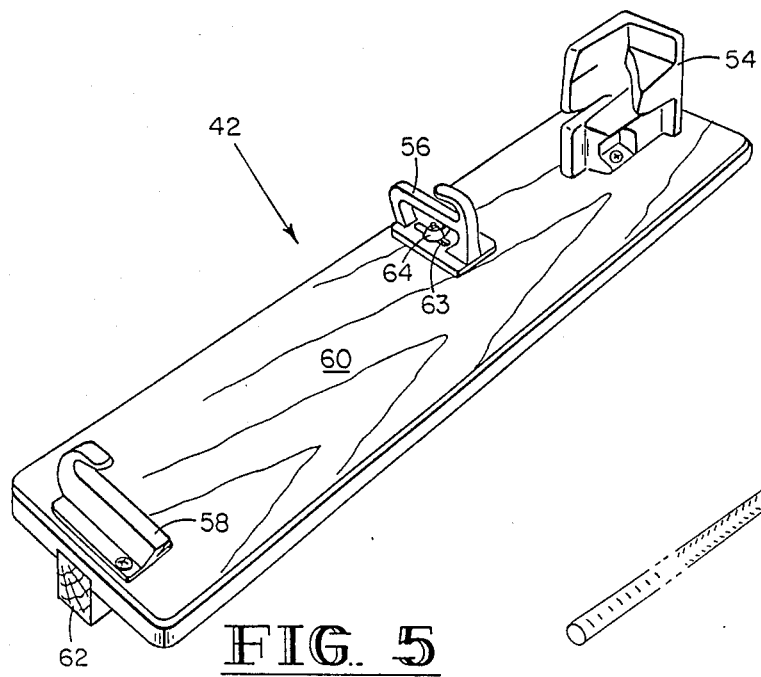
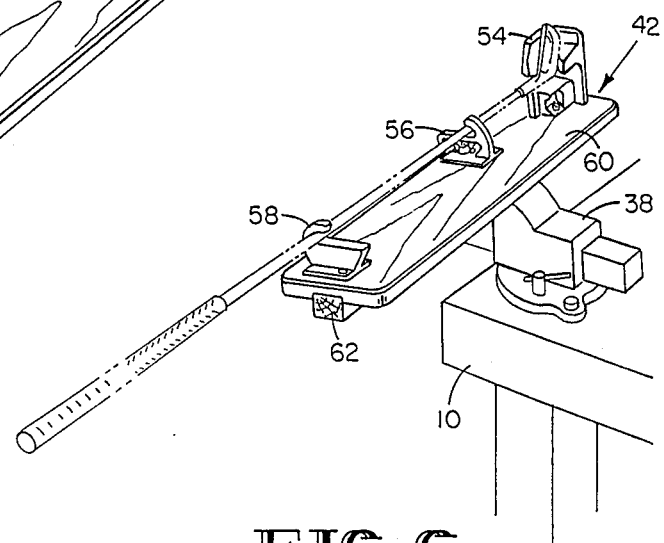
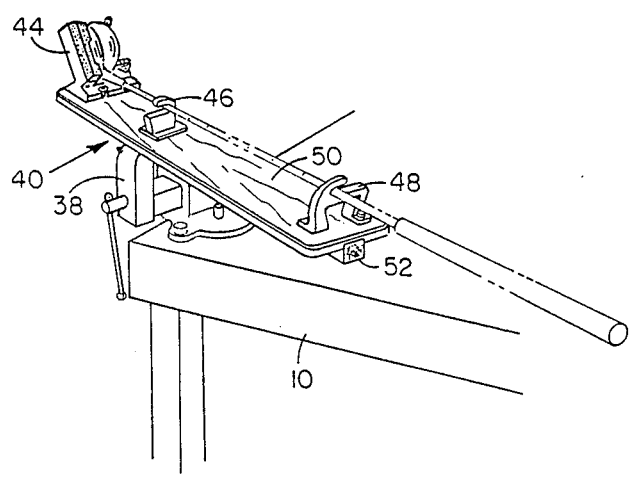
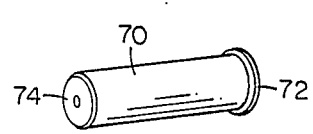
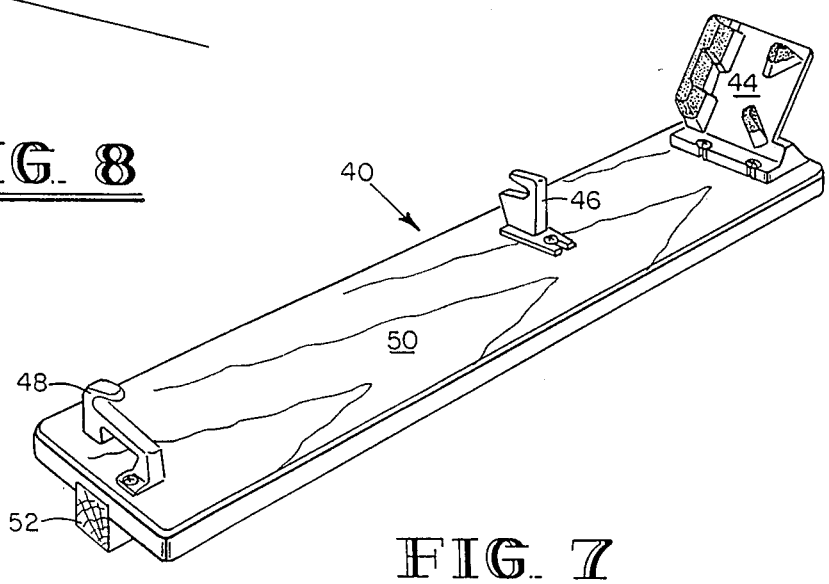

APPARATUS AND METHOD FOR MANUFACTURING CUSTOM GOLF CLUB SETS

BACKGROUND OF THE INVENTION

1. Field of the Invention

Applicant's invention relates to apparatuses and methods for manufacturing golf clubs.

2. Background Information

At present, golf clubs are either mass produced by large manufacturing concerns using assembly line methods or are produced by hand, a single club at a time. Making golf club sets by the latter method involves considerable effort and time. This places the price of custom golf club sets out of the reach of most golfers.

For each golf club assembled by other than mass production methods, the head and butt ends of each club's shaft must be cut to achieve the desired length and shaft flexibility. Thus, to produce a full set of golf clubs which may include between eight and ten clubs depending on the player's preference, between sixteen and twenty individual shaft cuts must be made. If the person making the clubs lacks proper equipment and an optimally-efficient method for producing clubs, a great deal of unnecessary production time may be lost as a result of the difficulty and inefficiency of the production method.

In addition to shaft length, a given golf club set exhibits eight variable characteristics including shaft flexibility, club head design, swing weight, shaft material, loft, lie, and grip size. Of these variable characteristics, swing weight, loft, lie, and, to a degree, shaft flexibility are determined by the assembly process whereas the remaining variable characteristics are functions of the material and design of the components which are selected.

The loft of a golf club is defined as the acute angle defined by a first line parallel with the striking face of the club's head and oriented co-planar with the axis of the club's shaft and a second line perpendicular to the axis of the club's shaft and co-planar with the first line. The loft of the clubs of a typical golf club set will range from 17 to 56 degrees with the sandwedge having the largest angle of loft.

The lie of a golf club is defined as the acute angle defined by a first line corresponding to the axis of the club's shaft and a second line corresponding to the head's intended horizontal striking orientation. The lie of the clubs of a typical golf club set will range from 55 to 63 degrees with the sandwedge having the largest angle of lie.

The swing weight of a golf club relates to the club's weight distribution. Variation in swing weight is achieved by adding weight at the tip end of a club's shaft. Presently, weight is added by funneling lead shot or powder into a shaft at the butt end, allowing it to fall to the tip end, and sealing the lead at the tip end, usually by driving a cork into the shaft until it rests against the lead shot or powder near the tip end of the shaft. Adjusting swing weight by this method is not particularly precise nor is it completely safe for workers in that it involves exposure to lead. The swing weight of a club is measured by a fulcrum scale specifically outfitted for weighing golf clubs.

It is desirable and in the best interest of golfers to provide the golfing industry with improved equipment and methods for producing custom golf club sets with a high degree of precision and with the least possible expenditure of time and effort.

SUMMARY OF THE INVENTION

It is an object of the present invention to provide a novel assemblage of mechanisms and a method for utilizing the mechanisms in the production of golf club sets which method reduces the expenditure of time and effort needed for such production.

It is another object of the present invention to provide an apparatus for producing golf club sets, which apparatus permits the cuts which are made at the head and butt ends of each of the set's shafts to be made simultaneously.

It is another object of the present invention to provide an apparatus for producing golf club sets, which apparatus permits the manufacture of sets with greater efficiency and precision and with less effort and time expenditures than are required in using presently available apparatuses and methods.

It is another object of the present invention to provide an improved design for a weight used in adjusting the swing weight of a golf club.

In satisfaction of these and related objectives, Applicant's present invention provides an assemblage of mechanisms and a method for utilizing such mechanisms in the production of golf club sets. Applicant's invention permits its practitioner to achieve the most beneficial balance between monies invested in production facilities on the one hand and time and effort required for production on the other.

The assemblage of mechanisms of Applicant's invention includes a mechanism for concurrently positioning and securing all of the shafts of a golf club set for cutting. Also included are mechanisms for measuring and adjusting each club's loft and lie, a mechanism for determining each club's swing weight, a mechanism for contouring the tip end of each shaft for attaching a head thereto, a belt sander for abrading a portion of the tip end of each shaft and for removing burrs resulting from the cutting operation, and an apparatus for securing each shaft with its head affixed thereon in a precise orientation for attaching the grip for that club.

Applicant's invention also includes weights of a novel design for adjusting swing weight of golf clubs in the manufacturing process.

BRIEF DESCRIPTION OF THE DRAWINGS

FIG. 5 is a perspective view of the irons retainer of Applicant's invention.

FIG. 6 is a perspective view of the irons retainer mounted for use on a vise and with an irons club situated in the irons retainer.

FIG. 7 is a perspective view of the woods retainer of Applicant's invention.

FIG. 8 is a perspective view of the woods retainer mounted for use on a vise and with an irons club situated in the woods retainer.

FIG. 9 is a perspective view of the weight of Applicant's invention used in altering the swing weight of a golf club.

DETAILED DESCRIPTION OF THE PREFERRED EMBODIMENT

Figure 1A:
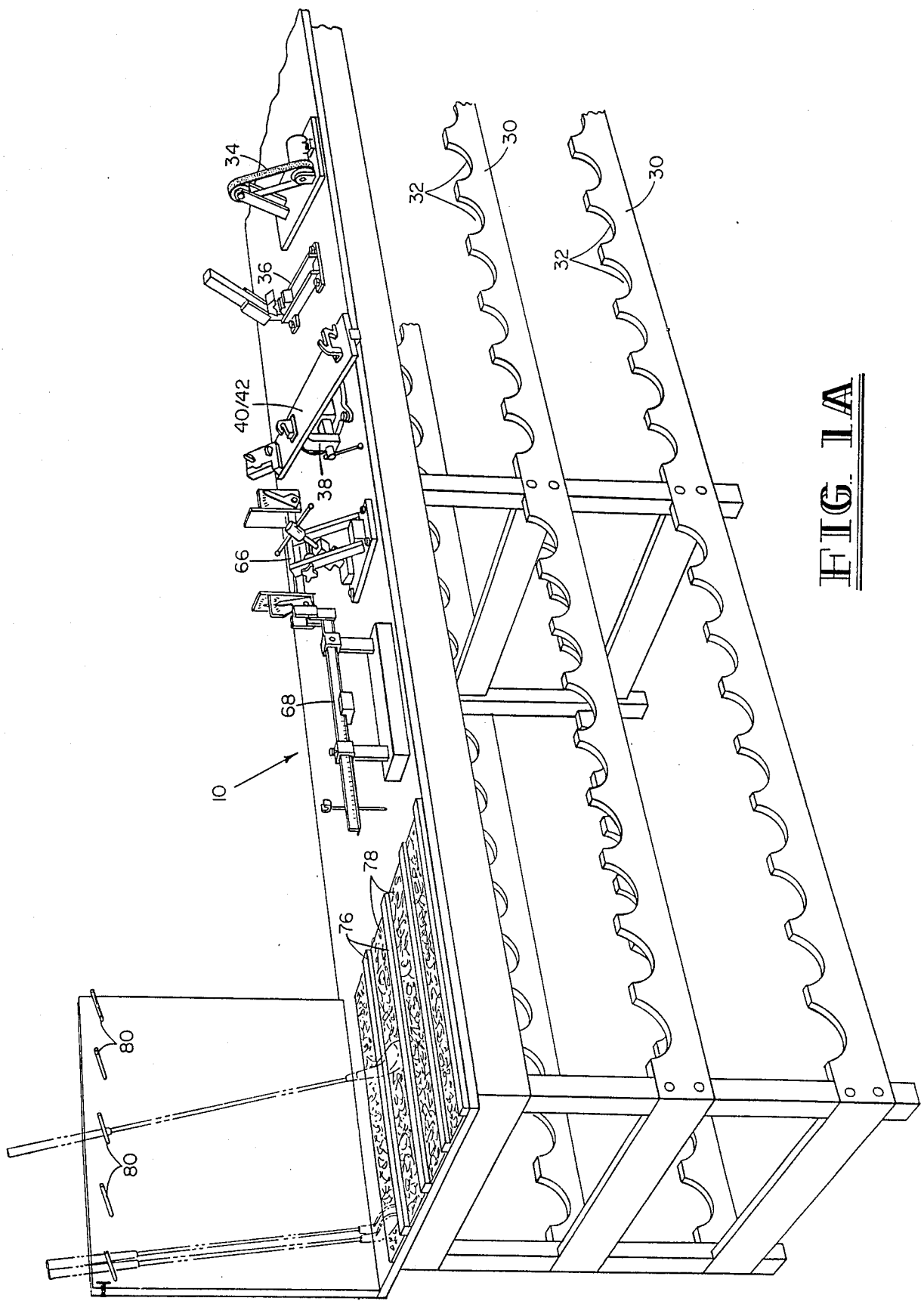
FIG. 1A is a partial perspective view of components of Applicant's invention.

Of the mechanisms included within the apparatus of Applicant's invention, those relating to cutting the shafts of golf club sets are depicted in FIG. 1A. A production table 10 serves as the mounting platform for a table saw 12 which is used in cutting the shafts of each golf club set. A fiber disk is to be used with the table saw 12 as such a disk achieves the smoothest cut for golf club shafts.

Figure 1B:
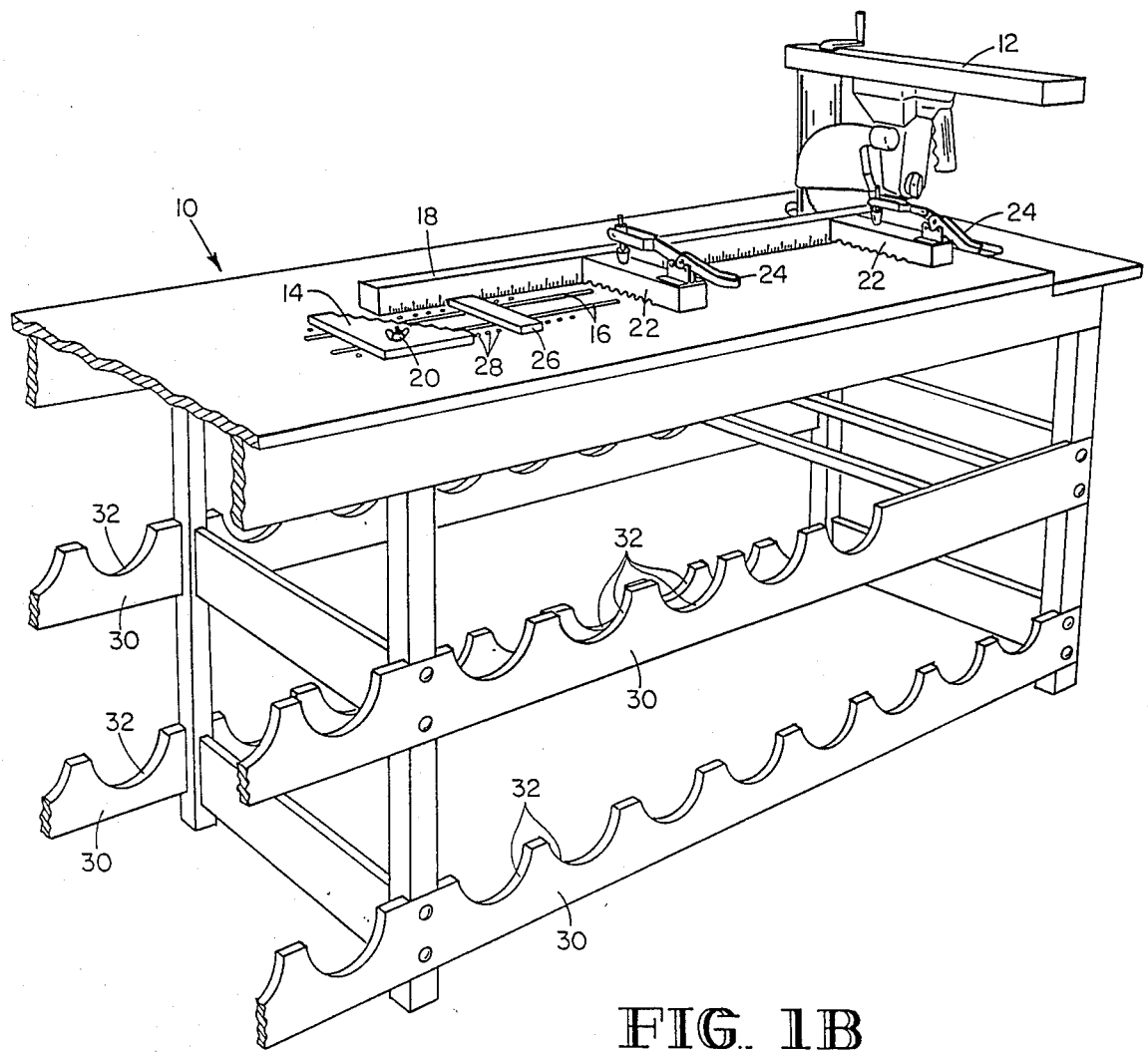
FIG. 1B is a partial perspective view of components of Applicant's invention.
Figure 2:
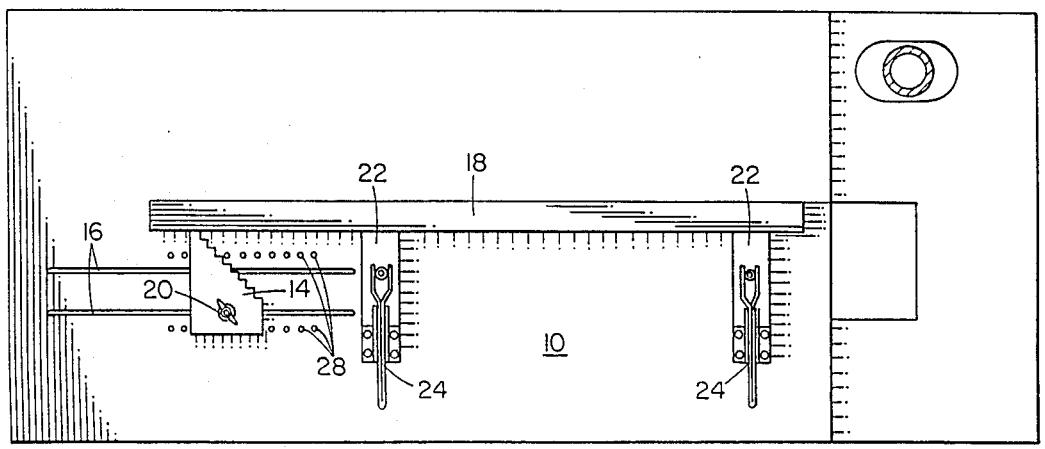
FIG. 2 is a top plan view of the apparatuses of Applicant's invention involved with cutting golf club shafts.
Figure 3A:
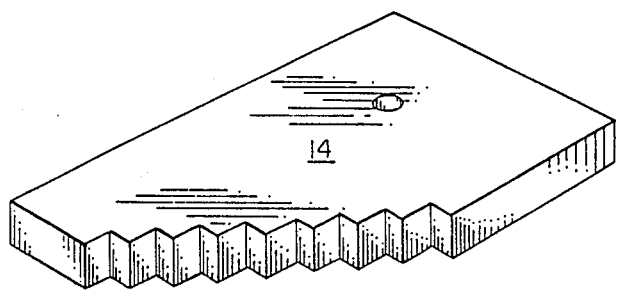
FIG. 3A is a perspective view of the step stop of Applicant's invention.

Referring to FIGS. 1B, 2, and 3A, a step stop 14 is slidably mounted along two channels 16 formed in the work surface of the production table 10. The step stop 14 serves to position the shafts of a complete set of golf clubs on the work surface of the production table 10 such that the butt end and tip end cuts may each be made in a single step using the table saw 12. Corresponding to the ¼ inch difference in length between successive clubs in a golf club set, the surface of the step stop 14 against which the ends of the shafts rest during the cutting operation is formed into a stair step-like configuration having "steps" for as many as ten shafts. By positioning an end of each of the 8 to 10 shafts respectively against each of the "steps" of the step stop 14, the single, straight-line cut which is made by the table saw 12 results in a complete set of golf club shafts having the proper ¼ inch increments of length.

Referring principally to FIGS. 1B and 2, a ruler 18 is mounted on the work surface of the production table 10 immediately adjacent to the step stop 14. The ruler 18 is positioned such that the desired length of the 2-iron (the longest of the irons and the club from which the relative measurements of the other clubs in a set are measured) may be easily selected by aligning the 2-iron "step" (the innermost step closest to the ruler with the desired measurement indication on the ruler 18. For securing the step stop 14 in a desired position, a bolt and wing nut combination 20 passes through the step stop 14 and one of the channels 16. The step stop 14 is kept in proper alignment with the channels 16 by two runners (not shown in the drawings) which are mounted on the underside of the step stop 14 and which are sized for nesting within their respective channels 16.

In cutting a golf club shaft, cuts made at the shaft's butt end are solely for arriving at a desired length, whereas cuts may at the tip end are for arriving at a desired altered shaft flexibility. When received from the manufacturer, if left uncut at the tip end, a golf club shaft will have its greatest degree of flexibility which exceeds that of the normal golf club shaft. Segments of the tip end are removed to achieve a normal flexibility, with larger segments being removed to achieve a stiffer shaft. Once the desired flexibility is achieved, segments of the shafts, butt ends are removed to complete the length reduction needed to achieve the desired overall shaft length. The length of the butt end and tip end segments removed during the shaft cutting operation will be in standard, one-half inch increments throughout a golf club shaft in all but very unusual situations. Use of the step stop 14 facilitates such uniform cuts at both head and butt ends of the shafts.

Figure 3B:
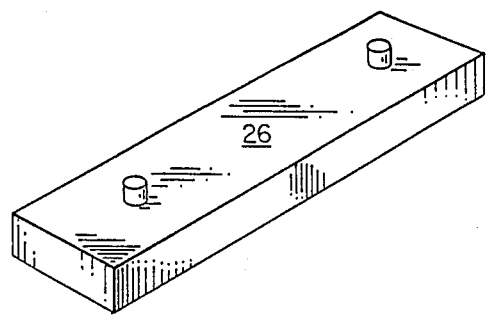
FIG. 3B is a perspective view of the flat stop of Applicant's invention.
Figure 4A:
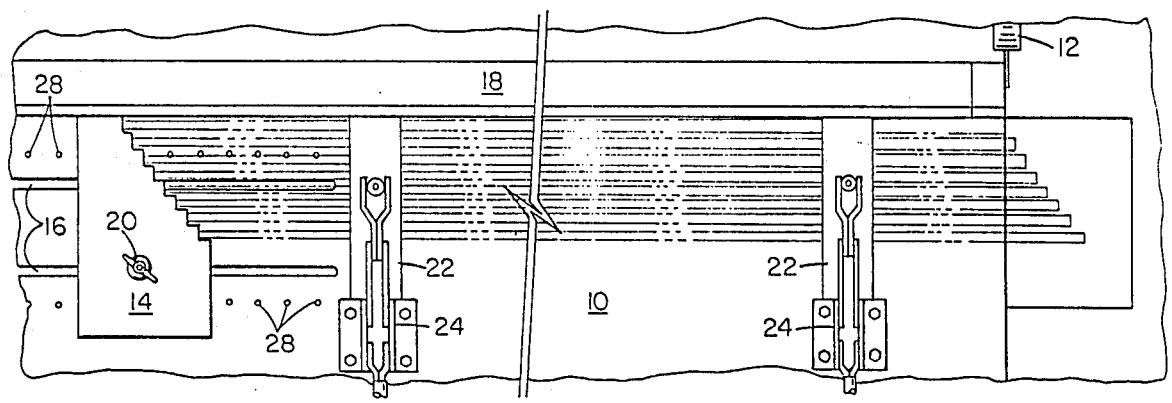
FIG. 4A is a top plan view of golf club shafts positioned by the step stop of Applicant's invention for cutting.
Figure 4B:
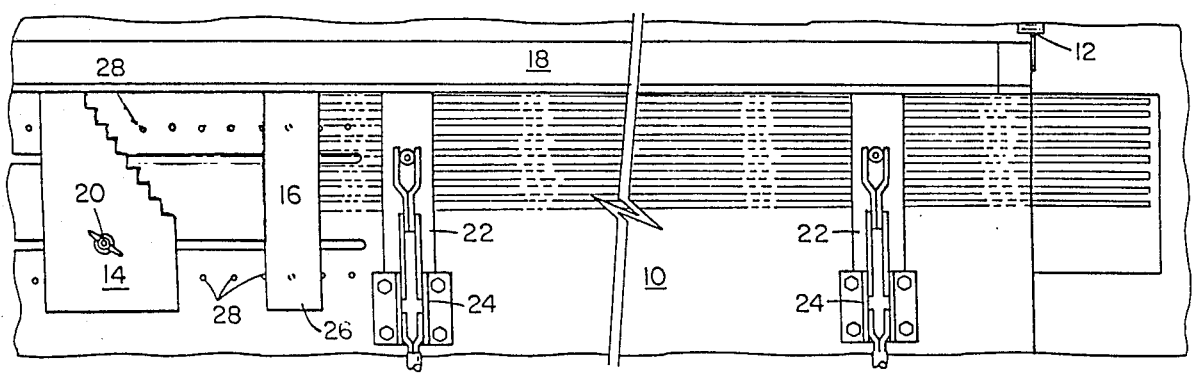
FIG. 4B is a top plan view of golf club shafts positioned by the flat stop of Applicant's invention for cutting.

Referring to FIGS. 3B and 4B, to permit a certain degree of mass production using applicant's invention, viz., manufacturing a number of 2 irons, then 3 irons, and so on, applicant's preferred embodiment provides a flat stop 26. As its name implies, the flat stop 26 has no "steps" and thus is used to cut an identical length from each shaft aligned against it. The flat stop 26 has two pegs which are inserted in stop holes 28 situated at one inch intervals corresponding to cutting shafts ranging from 38 inches to 47 inches in length.

Figure 3C:
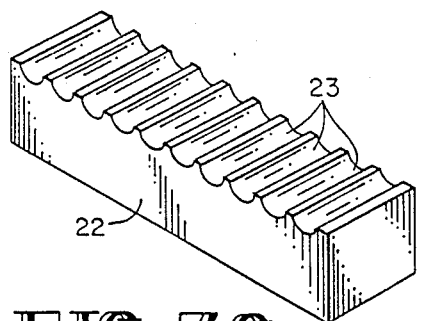
FIG. 3C is a perspective view of the guideblock of Applicant's invention.

Referring to FIGS. 3C, 4A and 4B, two guide blocks 22 are used to align a full set of shafts and secure them against the work surface of the production table 10 during use of either the step stop 14 or the flat stop 26. Each guide block has ten semi-circular grooves 24 corresponding in number and size to the maximum number of shafts which will be cut in each single cutting operation. The guide blocks 22 are, in turn, securely held in place over the shafts by two surface-mounted locking clamps 24.

Referring to FIGS. 1A and 1B, to facilitate performing each step in the manufacturing process for a number of golf club sets, the production table 10 is provided with shaft rack members 30 complimentarily arranged on either long side of the production table 10. Each shaft rack member 30 has a number of semi-circular cutaways 32 generally sized for accommodating the shafts included in one golf club set.

Prior to installing the head on a golf club shaft, one should abrade approximately one inch of the outer surface of the golf club shaft immediately adjacent to the shaft's tip end. This enhances the action of adhesives used in mounting heads on golf club shafts.

Referring to FIG. 1A, the preferred embodiment of Applicant's invention includes a belt sander 34 useful in abrading the surfaces of shafts. The belt sander 34 is also useful in removing burrs created during the cutting operations.

The preferred embodiment of Applicant's invention also includes a shaft crimper 36. The upper and lower members of the shaft crimper 36 each has an indentation defining one half of the space occupied by a golf club shaft at its tip end. A small protrusion (usually in the form of a partially embedded ball bearing but not visible in the drawings) is positioned in each of the indentations. The shaft crimper 36 designed as just-described serves to contour the tip end of a shaft for achieving a more positive joinder between the shaft and the head placed thereon. When producing golf clubs according to the methods of Applicant's invention, the shaft crimper 36 is used immediately after belt sander 34, unless the swing weight of a club is to be altered. In the latter event, a weight (to be discussed hereinafter) is inserted in the tip end of the shaft before crimping.

Referring to FIG. 1A, the preferred embodiment of Applicant's invention includes a vise 38 mounted on the work surface of the production table 10 adjacent to the shaft crimper 36. The vice 38 is principally used in practicing Applicant's invention for holding either a woods retainer 40 or an irons retainer 42. The retainers 40 and 42 are used for securely maintaining the shafts of a golf club set with their heads installed thereon in uniform orientations for properly and easily installing a golf club set's grips with emblems and markings on each grip being oriented identically to those on every other grip within the set.

Referring to FIGS. 7 and 8, the woods retainer 40 comprises a woods head piece 44, a woods mid-piece 46, a woods tail piece 48, a mounting board 50 and a vice rail 52. The woods head piece 44, mid-piece 46, and tail piece 48 are each coated with a smooth, non-abrasive surface to prevent scratching shaft surfaces during use.

Referring to FIGS. 5 and 6, the irons retainer 42 includes parts corresponding to those of the woods retainer 40. The irons retainer 42 includes an irons head piece 54, mid-piece 56, tail piece 58, mounting board 60 and vise rail 62. Unlike the woods retainer 40, the mid-piece 56 of the irons retainer 42 is designed to be adjustable to accommodate the highly-variable shaft/head offset which results from the many-differing irons head designs. A slot 63 in the irons' mid-piece 56 allows the mid-piece 56 move relative to a bolt and wing nut combination 64 for aligning with any given club's shaft. Like their corresponding members for the woods retainer 40, the head piece 54, mid-piece 56, and tail piece 58 of the irons retainer 42 are coated for presenting a non-abrasive surface to club shafts. Use of the words retainer 40 or irons retainer 42 as appropriate in producing golf clubs provides a considerable advantage, not only in convenience, but in reducing product "casualty rate." Because vices are often used to hold golf clubs for grip installation, shafts are often collapsed or bent by excessive or uneven force applied thereon. Also, holding a golf club shaft with a vise provides no guaranteed uniformity in grip position as does the irons retainer 42 or the woods retainer 40.

Once a club is secured by either the woods retainer 40 or the irons retainer 42, installing the club's grip is accomplished according to known procedures—two inch double sided grip tape is wrapped about the shaft where the grip is to be placed, naphtha or an equivalent solvent is placed on the tape to "activate" the glue, and the grip is positioned on the shaft.

Referring again to FIG. 1A, the preferred embodiment of Applicant's invention includes a loft/lie gauge and retainer 66 mounted on the work surface of the production table 10 adjacent to the vise 38. The loft/lie gauge and retainer 66 is used for measuring the extent to which the shaft of a club must be bent to achieve the requested loft and/or lie characteristics of the club. The loft/lie gauge and retainer 66 incorporated into Applicant's preferred embodiment is Scotland Loft and Lie Machine distributed exclusively by Ocean Club, Inc. of San Antonio, Tex. The loft/lie gauge and retainer 66 holds the head of a club securely enough to allow the shaft to be bent while situated within the retainer 66.

Adjacent to the loft/lie gauge and retainer 66 is a golf club scale 68. The scale 68 is primarily used when a particular non-standard swing weight has been requested. When a particular swing weight has been requested, a practitioner of Applicant's invention will, immediately after the shaft cutting operation, temporarily place each club's head and grip on the shaft for measuring the swing weight. When the amount of corrective weight is determined using the scale 68, a weight of Applicant's design (to be discussed hereinafter) is inserted into the tip end of each shaft prior to using the shaft crimper 36 (the deformation of the shaft operating to secure the weight within the shaft).

Referring to FIG. 9, Applicant's invention includes a weight 70 of novel design for altering the swing weight of golf clubs. The weight 70 will be manufactured in a number of weight increments to achieve any specific desired extent of swing weight correction. Each weight 70 is sized for telescopic insertion into the tip end of a shaft. Weights 70 will be sized for use in woods and irons shafts of the various materials presently available for golf club shafts. Each weight 70 has an annular flange 72 formed at one end. The flange 72 is slightly larger than the interior diameter of a golf club shaft, but is of slightly lesser diameter than the hosel of a golf club head. The flange 72 serves in concert with the head of the golf club to maintain the weight 70 at the tip end of the shaft. A hole 74 is formed opening at either end of the weight 70 in an axial orientation. The hole 74 permits air within the hosel of a club head to escape while installing the head on the shaft having the weight 70 therein. Without the hole 74, the air within the hosel would be compressed as the head is placed on the shaft and would tend to force the head from the shaft before the epoxy used in mounting the head fully cures. Use of the weight 70 in altering the swing weight of a golf club is considerably more convenient and precise then the presently practiced lead shot or powder/cork method.

Referring again to FIG. 1A, the second terminal end of the production table 10 opposite the shaft cutting apparatuses is outfitted for stockpiling completed golf club sets to await packaging for shipment or presentment to a purchaser. A number of 1 inch × ½ inch × 96 inch wood strips 76 are mounted on the work surface of the production table 10 parallel with the length of the table 10 and with each other. The wood strips 76 are separated from each other by approximately 3¼ inches. Carpet strips 78 are attached, preferably by gluing, to the working surface of the production table 10 between the wood strips 76. Six inch long pegs 80 are placed at six inch intervals on a wall or upright member immediately to the rear of the production table 10 and longitudinally coextensive with the wood strips 76 and carpet strips 78. The pegs 80 are positioned approximately thirty two inches above the production table's 10 work surface. The combination of the wood strips 76, the carpet strips 78, and the pegs 80 permit a large number of golf clubs to be stockpiled in a manner which prevents scratching or scarring of the shafts or of the heads of the finished clubs.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A golf club manufacturing system comprising:
   positioning means for positioning shafts of a set of golf clubs in relative positions for simultaneously cutting shafts according to said shafts' proper respective lengths, said positioning means comprising a step stop slidably mounted on a substantially planar surface for linear movement perpendicular to said cutting path of said cutting means, said cutting means being mounted so said cutting path is coplanar with said planar surface, said step stop having a face with a plurality of steps formed thereon, each said step having a first step face parallel with said cutting path and parallel with all other said first step faces and a second step face perpendicular to said first step faces and parallel with all other said second step faces, each said first step face and said second step face being displaced respectively from said first and second step faces of adjoining said steps by a distance of one-half inch as measured on an axis perpendicular to said first and second faces' respective planar surfaces; and cutting means having a linear cutting path for cutting said shafts.

2. The invention of claim 1 further comprising alignment means for maintaining said shafts in a mutually parallel orientation, perpendicular to said cutting path and abutting said first steps faces of said step stop.

3. The invention of claim 2 wherein said alignment means comprises a guide block of substantially rigid material, said guide block having a shaft side with a plurality of parallel semicircular furrows spanning said shaft side and equalling in number said steps on said step stop, each said furrow being sized to closely accommodate a length of one of said shafts coextensive with the length of said shaft side of said guide block, each said furrow's peripheral midpoint relative to said guide block being distanced one half inch from said peripheral midpoint of each adjacent said furrow.

4. The invention of claim 3 further comprising clamping means secured relative to said planar surface for securely maintaining said guide block in contact, through said shafts situated within said furrows, with said planar surface with said shaft side facing said planar surface with said guide block positioned for maintaining said shafts in said mutually parallel orientation, perpendicular to said cutting path and abutting said first steps faces of said step stop.

5. The invention of claim 4 further comprising measuring means positioned adjacent to and parallel with said step stop on said planar surface, said measuring means for indicating the distance between said first step face of said step immediately adjacent to said measuring means and said cutting path of said cutting means for determining the a proper position for said step stop on said planar surface for cutting said shafts abutted against said first step faces of said step stop to have desired dimensions.

6. The invention of claim 5 further comprising:

sanding means for abrading a portion of each said shaft for conditioning said shaft for bonding a club head thereon using an adhesive;

shaft contouring means for contouring a tip end of each of said shafts for mounting one said club head on said tip end of each said shaft;

loft and lie measuring and adjustment means for measuring loft and lie of clubs mode with said shafts and for adjusting said loft and lie according to desired parameters; and means for determining the swing weight of each assembled said club for ascertaining a need for corrective weighting.

7. The invention of claim 6 further comprising woods club shaft restraining means for restraining one said shaft having a woods head installed thereon in unvarying orientations for permitting installation of handle grips on said shaft in a consistent and uniform orientation relative to said woods head.

8. The invention of claim 7 further comprising irons club shaft restraining means for restraining one said shaft having an irons head installed thereon in unvarying orientations for permitting installation of handle grips on said shaft in a consistent and uniform orientation relative to said irons head.

9. The invention of claim 7 wherein said shaft restraining means comprises a woods head piece, a woods mid-piece, a woods tail piece, and a first mounting board, said first mounting board having a first planar mounting surface on which said woods head piece, said woods mid piece, and said woods tail piece are mounted, said mounting board having a first rail surface opposite said first mounting surface having first vice rail affixed thereto, said first vice rail for fixing said first mounting board with a vice, said woods head piece, said woods mid piece, and said woods tail piece collectively being formed and arranged on said first mounting board for accepting and securely holding one said shaft having said woods club head installed thereon in a non-varying orientation.

10. The invention of claim 8 wherein said shaft restraining means comprises a irons head piece, a irons mid-piece, a irons tail piece, and a second mounting board, said second mounting board having a second planar mounting surface on which said irons head piece, said irons mid piece, and said irons tail piece are mounted, said mounting board having a second rail surface opposite said second mounting surface having second vice rail affixed thereto, said second vice rail for fixing said second mounting board with a vice, said irons head piece, said irons mid piece, and said irons tail piece collectively being formed and arranged on said second mounting board for accepting and securely holding one said shaft having said irons club head installed thereon in a non-varying orientation.

11. A golf club manufacturing system comprising:

cutting means having a linear cutting path for cutting golf club shafts;

a step stop for positioning shafts of a set of golf clubs in relative positions for simultaneously cutting shafts according to said shafts, proper respective lengths, said step stop being slidably mounted on a substantially planar surface for linear movement perpendicular to said cutting path of said cutting means, said cutting means also being mounted on said planar surface, said step stop having a face with a plurality of steps formed thereon, each said step having a first step face parallel with said cutting path and parallel with all other said first step faces and a second step face perpendicular to said first step faces and parallel with all other said second step faces, each said first step face and said second step face being displaced respectively from said first and second step faces of adjoining said steps by a distance of one-half inch as measured on an axis perpendicular to said first and second faces' respective planar surfaces;

a guide block for maintaining said shafts in a mutually parallel orientation, perpendicular to said cutting path and abutting said first steps faces of said step stop, said guide block having a shaft side with a plurality of parallel semicircular furrows spanning said shaft side and equalling in number said steps on said step stop, each said furrow being sized to closely accommodate a length of one of said shafts coextensive with the length of said shaft side of said guide block, each said furrow's peripheral midpoint relative to said guide block being distanced one half inch from said midpoint of each adjacent said furrow;

clamping means secured relative to said planar surface for securely maintaining said guide block in contact, through said shafts situated within said furrows, with said planar surface with said shaft side facing said planar surface with said guide block positioned for maintaining said shafts in said mutually parallel orientation, perpendicular to said cutting path and abutting said first steps faces of said step stop; and measuring means positioned adjacent to and parallel with said step stop on said planar surface, said measuring means for indicating the distance between said first step face of said step immediately adjacent to said measuring means and said cutting path of said cutting means for determining the a proper position for said step stop on said planar surface for cutting said shafts abutted against said first step faces of said step stop to have desired dimensions.

12. A golf club manufacturing system comprising:

cutting means having a linear cutting path for cutting golf club shafts;

a step stop for positioning shafts of a set of golf clubs in relative positions for simultaneously cutting shafts according to said shafts' proper respective lengths, said step stop being slidably mounted on a substantially planar surface for linear movement perpendicular to said cutting path of said cutting means, said cutting means also being mounted on said planar surface, said step stop having a face with a plurality of steps formed thereon, each said step having a first step face parallel with said cutting path and parallel with all other said first step faces and a second step face perpendicular to said first step faces and parallel with all other said second step faces, each said first step face and said second step face being displaced respectively from said first and second step faces of adjoining said steps by a distance of one-half inch as measured on an axis perpendicular to said first and second faces' respective planar surfaces;

a guide block for maintaining said shafts in a mutually parallel orientation, perpendicular to said cutting path and abutting said first steps faces of said step stop, said guide block having a shaft side with a plurality of parallel semicircular furrows spanning said shaft side and equalling in number said steps on said step stop, each said furrow being sized to closely accommodate a length of one of said shafts coextensive with the length of said shaft side of said guide block, each said furrow's peripheral midpoint relative to said guide block being distanced one half inch from said midpoint of each adjacent said furrow;

clamping means secured relative to said planar surface for securely maintaining said guide block in contact, through said shafts situated within said furrows, with said planar surface with said shaft side facing said planar surface with said guide block positioned for maintaining said shafts in said mutually parallel orientation, perpendicular to said cutting path and abutting said first steps faces of said step stop;

measuring means positioned adjacent to and parallel with said step stop on said planar surface, said measuring means for indicating the distance between said first step face of said step immediately adjacent to said measuring means and said cutting path of said cutting means for determining the a proper position for said step stop on said planar surface for cutting said shafts abutted against said first step faces of said step stop to have desired dimensions;

sanding means for abrading a portion of each said shaft for conditioning said shaft for bonding a club head thereon using an adhesive;

shaft contouring means for contouring a tip end of each of said shafts for mounting one said club head on said tip end of each said shaft;

loft and lie measuring and adjustment means for measuring loft and lie of clubs made with said shafts and for adjusting said loft and lie according to desired parameters; and means for determining the swing weight of each assembled said club for ascertaining a need for corrective weighting;

woods club shaft restraining means for restraining one said shaft having a woods head installed thereon in unvarying orientations for permitting installation of handle grips on said shaft in a consistent and uniform orientation relative to said woods head, said woods club shaft restraining means comprising a woods head piece, a woods mid-piece, a woods tail piece, and a first mounting board, said first mounting board having a first planar mounting surface on which said woods head piece, said woods mid piece, and said woods tail piece are mounted, said mounting board having a first rail surface opposite said first mounting surface having first vice rail affixed thereto, said first vice rail for fixing said first mounting board with a vice, said woods head piece, said woods mid piece, and said woods tail piece collectively being formed and arranged on said first mounting board for accepting and securely holding one said shaft having said woods club head installed thereon in a non-varying orientation; and irons club shaft restraining means for restraining one said shaft having a irons head installed thereon in unvarying orientations for permitting installation of handle grips on said shaft in a consistent and uniform orientation relative to said irons head, said irons club shaft restraining means comprising a irons head piece, a irons mid-piece, a irons tail piece, and a second mounting board, said second mounting board having a second planar mounting surface on which said irons head piece, said irons mid piece, and said irons tail piece are mounted, said mounting board having a second rail surface opposite said second mounting surface having second vice rail affixed thereto, said second vice rail for fixing said second mounting board with a vice, said irons head piece, said irons mid piece, and said irons tail piece collectively being formed and arranged on said second mounting board for accepting and securely holding one said shaft having said irons club head installed thereon in a non-varying orientation.

13. A golf club manufacturing system comprising:

positioning means for positioning shafts of a set of golf clubs in relative positions for simultaneously cutting shafts according to said shafts, proper respective lengths;

shaft alignment and securing means for securing said shafts in proper orientation relative to said shaft positioning means for cutting said shafts;

position indicating means for indicating a desired position for said shaft positioning means so said shafts may be correctly cut;

cutting means for cutting said shafts;

shaft restraining means for restraining said shafts in unvarying orientations for uniformly installing handle grips on said shafts;

shaft contouring means for contouring a tip end of each of said shafts for mounting a club head on said tip end of said shaft;

loft and lie measuring and adjustment means for measuring loft and lie of clubs made with said shafts and for adjusting said loft and lie according to desired parameters; and means for determining the swing weight of each assembled club for ascertaining a need for corrective weighting.

14. A method for manufacturing a set of golf clubs comprising the steps of:

selecting a plurality of golf club shafts corresponding in number with the number of said golf clubs to be included within said set;

using a step stop, positioning said shafts on a substantially planar surface in relative positions for simultaneously cutting said shafts, according to said shafts' proper respective lengths, with cutting means mounted on said planar surface and having a linear cutting path, said step stop having a face with a plurality of steps formed thereon, each said step having a first step face parallel with said cutting path and parallel with all other said first step faces and a second step face perpendicular to said first step faces and parallel with all other said second step faces, each said first step face and said second step face being displaced respectively from said first and second step faces of adjoining said steps by a distance of one-half inch as measured on an axis perpendicular to said first and second faces, respective planar surfaces;

using a guide block, aligning said shafts in a mutually parallel orientation, perpendicular to said cutting path and abutting said first steps faces of said step stop, said guide block having a shaft side with a plurality of parallel semicircular furrows spanning said shaft side and equalling in number said steps on said step stop, each said furrow being sized to closely accommodate a length of one of said shafts coextensive with the length of said shaft side of said guide block, each said furrow's peripheral midpoint relative to said guide block being distanced one half inch from said midpoint of each adjacent said furrow;

using clamping means, restraining said guideblock with said shafts being situated within said furrows against said planar surface, said guide block being positioned for maintaining said shafts in said mutually parallel orientation, perpendicular to said cutting path and abutting said first steps faces of said step stop;

using measuring means, insuring said shafts are properly positioned for cutting with said cutting means, said measuring means being positioned adjacent to and parallel with said step stop on said planar surface for indicating the distance between said first step face of said step immediately adjacent to said measuring means and said cutting path of said cutting means for determining a proper position for said step stop on said planar surface for cutting said shafts according to desired dimensions;

cutting said shafts with said cutting means;

using sanding means, sequentially abrading a portion of each said shaft at said shaft's tip end, said abrading for conditioning said shaft for bonding a club head thereon using an adhesive;

sequentially placing a woods head or an irons head on said tip end of each said shaft;

using loft and lie measuring and adjustment means, sequentially measuring loft and lie of each said shaft with said woods or irons head placed thereon and adjusting said loft and lie according to desired parameters;

using swing weight measuring means, sequentially determining the swing weight of each said shaft with said woods or irons head placed thereon for ascertaining a need for corrective weighting and, if said corrective weighting is necessary, adjusting said swing weight of each said shaft with said woods or irons head placed thereon using swing weight adjustment means;

removing each said woods or iron head from respective said shafts;

using shaft contouring means, contouring a tip end of each of said shafts for mounting one said club head on said tip end of each said shaft;

placing adhesive in the hosel of each said iron or wood head and placing each said iron or wood head on its respective said shaft;

using woods club shaft restraining means after waiting sufficient time for said adhesive to cure, sequentially restraining each said shaft having a woods head installed thereon in unvarying orientations and installing handle grips on said shafts in a consistent and uniform orientation relative to said woods head, said woods club shaft restraining means comprising a woods head piece, a woods mid-piece, a woods tail piece, and a first mounting board, said first mounting board having a first planar mounting surface on which said woods head piece, said woods mid piece, and said woods tail piece are mounted, said mounting board having a first rail surface opposite said first mounting surface having first vice rail affixed thereto, said first vice rail for fixing said first mounting board with a vice, said woods head piece, said woods mid-piece, and said woods tail piece collectively being formed and arranged on said first mounting board for accepting and securely holding one said shaft having said woods club head installed thereon in a non-varying orientation; and using irons club shaft restraining means after waiting sufficient time for said adhesive to cure, sequentially restraining each said shaft having a irons head installed thereon in unvarying orientations and installing handle grips on said shafts in a consistent and uniform orientation relative to said irons head, said irons club shaft restraining means comprising a irons head piece, a irons mid-piece, a irons tail piece, and a first mounting board, said first mounting board having a first planar mounting surface on which said irons head piece, said irons mid piece, and said irons tail piece are mounted, said mounting board having a first rail surface opposite said first mounting surface having first vice rail affixed thereto, said first vice rail for fixing said first mounting board with a vice, said irons head piece, said irons mid piece, and said irons tail piece collectively being formed and arranged on said first mounting board for accepting and securely holding one said shaft having said irons club head installed thereon in a non-varying orientation.

* * * * *